(12) United States Patent
Boreman et al.

(10) Patent No.: US 9,182,526 B2
(45) Date of Patent: Nov. 10, 2015

(54) TUNABLE OPTICAL DIFFRACTION GRATING APPARATUS AND RELATED METHODS

(75) Inventors: Glenn Boreman, Charlotte, NC (US);
David Shelton, Orlando, FL (US)

(73) Assignee: UNIVERSITY OF CENTRAL FLORIDA, Orlando, FL (US)

( * ) Notice: Subject to any disclaimer, the term of this patent is extended or adjusted under 35 U.S.C. 154(b) by 279 days.

(21) Appl. No.: 13/206,861

(22) Filed: Aug. 10, 2011

(65) Prior Publication Data

US 2013/0038937 A1 Feb. 14, 2013

(51) Int. Cl.
| G02B 27/00 | (2006.01) |
| G02F 1/29 | (2006.01) |
| G02B 5/18 | (2006.01) |
| G02B 6/293 | (2006.01) |
| B29D 11/00 | (2006.01) |

(52) U.S. Cl.
CPC ........ *G02B 5/1828* (2013.01); *B29D 11/00269* (2013.01); *G02B 5/1876* (2013.01); *G02B 6/29395* (2013.01)

(58) Field of Classification Search
USPC ......... 359/260, 365, 269, 565, 578, 579, 288, 359/315, 316; 250/226; 524/497; 257/2, 257/315
See application file for complete search history.

(56) References Cited

U.S. PATENT DOCUMENTS

| 3,509,348 A | 4/1970 | Williams |
| 4,283,113 A | 8/1981 | Eden |
| 4,400,412 A | 8/1983 | Scanlon et al. |
| 4,401,690 A | 8/1983 | Greenberg |
| 4,530,736 A * | 7/1985 | Mutter ............................ 216/26 |

(Continued)

FOREIGN PATENT DOCUMENTS

| WO | 2010014974 A2 | 2/2010 | |
| WO | WO 2010/138876 A2 * | 12/2010 | .......... H01L 21/8247 |

(Continued)

OTHER PUBLICATIONS

A. Crunteanu et al.; "Integration of VO2 Thin Films Presenting a Semiconductor-To-Metal-Phase Transition for Fabrication of Microwave Switches and Tunable Filters," (2008).

(Continued)

*Primary Examiner* — Audrey Y Chang
(74) *Attorney, Agent, or Firm* — William Greener; Alek P. Szecsy; Bond, Schoeneck & King PLLC (57) ABSTRACT

A tunable optical diffraction grating apparatus, such as but not limited to a tunable Fresnel zone lens apparatus, includes a plurality of symmetric repeating structures (i.e., typically concentric rings) located over a substrate and comprising a material susceptible to a transparent to opaque transition for a designated radiation wavelength. The tunable optical diffraction grating apparatus also includes a means for separately effecting the transparent to opaque transition for each of the plurality of symmetric repeating structures to provide a plurality of transparent zones each comprising a variable first sub-plurality of adjacent transparent symmetric repeating structures alternating and interposed between a plurality of opaque zones each comprising a variable second sub-plurality of adjacent opaque symmetric repeating structures. Also included are a method for fabricating the tunable optical diffraction grating apparatus and a method for operating the tunable optical diffraction grating apparatus.

29 Claims, 4 Drawing Sheets

(56) References Cited

U.S. PATENT DOCUMENTS

| | | | |
|---|---|---|---|
| 4,586,164 | A | 4/1986 | Eden |
| 4,795,240 | A | 1/1989 | Wong et al. |
| 5,285,314 | A * | 2/1994 | Futhey .................. 359/565 |
| 5,330,708 | A | 7/1994 | Martinson et al. |
| 5,801,383 | A | 9/1998 | Wada et al. |
| 5,900,799 | A | 5/1999 | Morris |
| 6,121,618 | A | 9/2000 | Morris |
| 6,144,512 | A | 11/2000 | Eden |
| 6,440,592 | B1 | 8/2002 | Meyer |
| 6,653,704 | B1 | 11/2003 | Gurney |
| 7,035,498 | B2 | 4/2006 | Wu et al. |
| 7,337,552 | B2 * | 3/2008 | Smith et al. ............. 33/645 |
| 7,691,435 | B2 | 4/2010 | Keller et al. |
| 7,755,829 | B2 | 7/2010 | Powers et al. |
| 7,768,693 | B2 | 8/2010 | McCarthy et al. |
| 8,576,473 | B2 * | 11/2013 | Shim et al. ............. 359/288 |
| 2003/0227664 | A1* | 12/2003 | Agrawal et al. ........... 359/269 |
| 2006/0231872 | A1 | 10/2006 | Kim et al. |
| 2007/0179239 | A1* | 8/2007 | Li .................. 524/497 |
| 2010/0123532 | A1 | 5/2010 | Hillman et al. |
| 2010/0225989 | A1 | 9/2010 | Anders |
| 2010/0233874 | A1 | 9/2010 | Ito et al. |
| 2010/0270519 | A1 | 10/2010 | Blackman et al. |
| 2010/0309539 | A1 | 12/2010 | Kaye et al. |
| 2011/0085964 | A1 | 4/2011 | Lukehart et al. |
| 2011/0120855 | A1 | 5/2011 | Ramanathan et al. |

FOREIGN PATENT DOCUMENTS

| | | |
|---|---|---|
| WO | 2011047370 A1 | 4/2011 |
| WO | 2011047393 A1 | 4/2011 |

OTHER PUBLICATIONS

A. Crunteanu et al.; "Exploiting the semiconductor-metal phase transition of VO2 materials; a novel direction towards tuneable devices and systems for RF—microwaveable applications," Advanced Microwave and Millimeter Wave Technologies: Semiconductor Devices, Circuits and Systems, (2010).

M. Rini et al; "Photoinduced phase transition in VO2 nanocrystals: ultafast control of surface-plasmon resonance," Opt. Letters, vol. 30 No. 5 (Mar. 2005).

Z. Yang. "Metal-insnulator transition characteristics of VO2 thin films grown on Ge(100) single crystals." Journal of Applied Physics 108, 073708 (2010).

* cited by examiner

TUNABLE OPTICAL DIFFRACTION GRATING APPARATUS AND RELATED METHODS

BACKGROUND

1. Field of the Invention

Embodiments relate generally to optical diffraction grating apparatus, such as but not limited to Fresnel zone lens apparatus. More particularly, embodiments relate to enhanced performance optical diffraction grating apparatus, such as but not limited to enhanced performance Fresnel zone lens apparatus.

2. Description of the Related Art

As technology has advanced, the use of electro-optic principles and electro-optic devices in place of mechano-optic principles and mechano-optic devices has become more prevalent in systems including but not limited to optical imaging systems. A particular example of such a transition from mechano-optic principles and mechano-optic devices to electro-optical principles and electro-optical devices is represented by the transition from conventional photography and imaging that uses photographic film and mechanically controlled cameras, to digital photography and imaging that uses electronic sensor based imaging arrays as an imaging means.

Often included within electro-optical imaging systems are lenses that are intended to focus an optical image at a focal plane. Such lenses often operate by refraction of light incident upon a particular lens, but alternative lens constructions that operate by a diffraction of light incident upon a particular lens are also known. Of such lenses that operate by diffraction of light incident upon a particular lens, a Fresnel zone lens is a common and representative example.

A two-dimensional Fresnel zone lens generally comprises concentric rings either located and formed over a substrate, or integral with a substrate, where each of the plurality of concentric rings has either: (1) the same zone radius (i.e., to provide a sinusoidal Fresnel zone lens); or (2) the same zone area (i.e., to provide a binary Fresnel zone lens). Sinusoidal Fresnel zone lenses are desirable insofar as sinusoidal Fresnel zone lenses provide a single image at a single focal plane whose distance from the sinusoidal Fresnel zone lens is determined by the zone radius for a particular incident radiation wavelength. Alternatively, binary Fresnel zone lenses are desirable insofar as they provide an image at a primary focal plane, in addition to several subsidiary images at several subsidiary focal planes.

While Fresnel zone lenses are popular and desirable within the optical device and optical imaging art, Fresnel zone lenses are nonetheless not entirely without problems. In that regard, desirable are Fresnel zone lenses that may operate with enhanced flexibility and efficiency within the context of systems including but not limited to optical imaging systems.

SUMMARY

Embodiments include: (1) an optical diffraction grating apparatus, such as but not limited to a Fresnel zone lens apparatus: (2) a method for fabricating the optical diffraction grating apparatus, such as but not limited to the Fresnel zone lens apparatus; and (3) a method for operating the optical diffraction grating apparatus, such as but not limited to the Fresnel zone lens apparatus.

The optical diffraction grating apparatus in accordance with the embodiments includes a plurality of symmetric repeating structures (e.g., typically concentric rings) located and formed over a substrate, where each of the plurality of symmetric repeating structures located and formed over the substrate comprises a material controllably susceptible to a transparent to opaque transition at a designated radiation wavelength. The optical diffraction grating apparatus in accordance with the embodiments also includes a means for effecting the transparent to opaque transition with respect to each individual symmetric repeating structure of the plurality of symmetric repeating structures to provide alternating transparent and opaque zones located and formed over the substrate, each transparent zone comprising a variable sub-plurality of transparent adjacent symmetric repeating structures and each opaque zone comprising a variable sub-plurality of opaque adjacent symmetric repeating structures.

Thus, an optical diffraction grating apparatus in accordance with the embodiments comprises a tunable optical diffraction grating apparatus, since an optical diffraction grating apparatus in accordance with the embodiments provides for selection of differing numbers of adjacent sub-plurality of symmetric repeating structures to provide a plurality of transparent zones and a plurality of opaque zones of either differing zone radii or differing zone area that may provide within the context of a Fresnel zone lens apparatus, respectively, a tunable sinusoidal Fresnel zone lens apparatus or a tunable binary Fresnel zone lens apparatus in accordance with the embodiments.

A particular optical apparatus in accordance with the embodiments includes a plurality of symmetric repeating structures located separated over a substrate and comprising a material controllably susceptible to a transparent to opaque transition for a designated radiation wavelength. The particular optical apparatus in accordance with the embodiments also includes a means for separately effecting the transparent to opaque transition for each of the plurality of symmetric repeating structures to provide: (1) a plurality of transparent zones located over the substrate each transparent zone comprising a variable first sub-plurality of adjacent transparent symmetric repeating structures; alternating with and interposed between (2) a plurality of opaque zones located over the substrate each opaque zone comprising a variable second sub-plurality of adjacent opaque symmetric repeating structures.

A particular method for fabricating an optical apparatus in accordance with the embodiments includes forming over a substrate an optical transition material layer comprising a material controllably susceptible to a transparent to opaque transition for a designated radiation wavelength. The particular method also includes patterning the optical transition material layer to form a patterned optical transition material layer comprising a plurality of symmetric repeating structures. The particular method also includes assembling connected to the substrate a means for separate activation of each of the plurality of symmetric repeating structures to provide: (1) a plurality of transparent zones located over the substrate each transparent zone comprising a variable first sub-plurality of adjacent transparent symmetric repeating structures; alternating with and interposed between (2) a plurality of opaque zones located over the substrate each opaque zone comprising a variable second sub-plurality of adjacent opaque symmetric repeating structures.

A particular method for operating an optical apparatus in accordance with the embodiments includes providing an optical apparatus comprising: (1) a plurality of symmetric repeating structures located separated over a substrate and comprising a material controllably susceptible to a transparent to opaque transition for a designated radiation wavelength; and (2) a means for separately effecting the transparent to opaque transition for each of the plurality of symmetric repeating structures to provide: (a) a plurality of transparent zones located over the substrate each transparent zone comprising a variable first sub-plurality of adjacent transparent symmetric repeating structures; alternating with and interposed between (b) a plurality of opaque zones located over the substrate each opaque zone comprising a variable second sub-plurality of adjacent opaque symmetric repeating structures. This particular method also includes enabling the means for separately effecting the transparent to opaque transition for each of the plurality of symmetric repeating structures to provide: (a) the plurality of transparent zones located over the substrate each transparent zone comprising the variable first sub-plurality of adjacent transparent symmetric repeating structures; alternating with and interposed between (b) the plurality of opaque zones located over the substrate each opaque zone comprising the variable second sub-plurality of adjacent opaque symmetric repeating structures Within applicant's embodiments as described and invention as claimed "a plurality of variably effected transparent and opaque symmetric repeating structures alternately interposed with each other over the substrate" is intended as alternative equivalent language for: (1) "a plurality of transparent zones located over the substrate each transparent zone comprising a variable first sub-plurality of adjacent transparent symmetric repeating structures; alternating with and interposed between" (2) "a plurality of opaque zones located over the substrate each opaque zone comprising a variable second sub-plurality of adjacent opaque symmetric repeating structures."

BRIEF DESCRIPTION OF THE DRAWINGS

The objects, features and advantages of the embodiments are understood within the context of the Detailed Description of the Embodiments, as set forth below. The Detailed Description of the Embodiments is understood within the context of the accompanying drawings, which form a material part of this disclosure, wherein.

DETAILED DESCRIPTION OF THE EMBODIMENTS

Exemplary non-limiting embodiments provide a Fresnel zone lens apparatus and related methods directed towards fabricating the Fresnel zone lens apparatus and operating the Fresnel zone lens apparatus. The Fresnel zone lens apparatus in accordance with the embodiments is tunable with respect to both zone radii and zone area to provide a tunable sinusoidal amplitude Fresnel zone lens apparatus or a tunable binary amplitude Fresnel zone lens apparatus, respectively. Either the zone radii or the zone area may be tuned within a tunable Fresnel zone lens apparatus in accordance with the exemplary non-limiting embodiments insofar as a tunable Fresnel zone lens apparatus in accordance with the embodiments comprises a plurality of symmetric repeating structures (e.g., typically concentric rings) located and formed over a substrate, and with the plurality of symmetric repeating structures comprising a material controllably susceptible to a transparent to opaque transition, where numerically adjustable sub-pluralities of the plurality of symmetric repeating structures (e.g., concentric rings) are each selected to provide mutually interposed transparent zones and opaque zones over the substrate within a Fresnel zone lens apparatus in accordance with the embodiments.

While the exemplary non-limiting embodiments provide a tunable Fresnel zone lens apparatus and related methods directed towards fabricating the tunable Fresnel zone lens apparatus or operating the tunable Fresnel zone lens apparatus, the exemplary non-limiting embodiments and the invention are not necessarily intended to be so limited. Rather, the embodiments in a more general sense provide a tunable optical diffraction grating apparatus, whether or not specifically characterized as a tunable Fresnel zone lens optical diffraction grating apparatus. In that regard, additional non-limiting embodiments also contemplate that such an alternative tunable optical diffraction grating apparatus may include a non-mechanical beam steering apparatus.

Figure 1A:
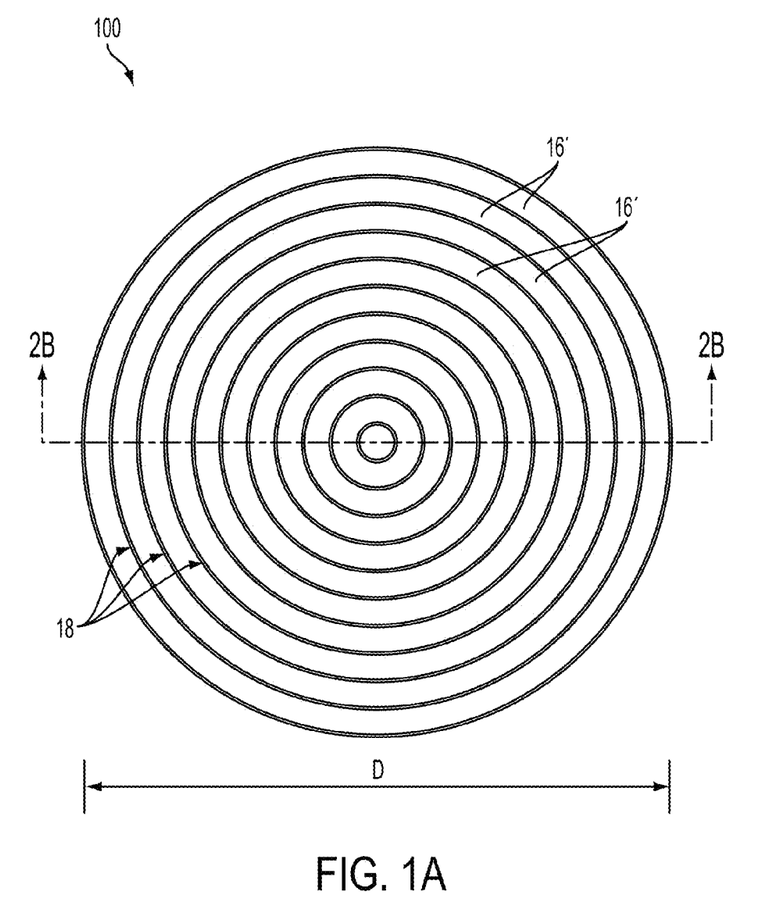
FIG. 1A shows a schematic plan-view diagram of a two-dimensional Fresnel zone lens apparatus in accordance with the embodiments.

FIG. 1A shows more specifically a schematic plan-view diagram of an exemplary and non-limiting tunable Fresnel zone lens apparatus 100 in accordance with the embodiments after at least partial fabrication of the tunable Fresnel zone lens apparatus 100 and prior to operation of the tunable Fresnel zone lens apparatus 100. Although not specifically illustrated in FIG. 1, the tunable Fresnel zone lens apparatus 100 in a first instance comprises a substrate as a supporting component for thin film layers that otherwise comprise the tunable Fresnel zone lens apparatus 100 and are located and formed over the substrate.

As is illustrated in FIG. 1A, the tunable Fresnel zone lens apparatus 100 includes a plurality of concentric rings 16' each separated by a gap 18 within a plurality of gaps 18 interposed between the plurality of concentric rings 16'. As will be discussed in greater detail below, each of the plurality of concentric rings 16' comprises a material that is controllably susceptible to a transparent to opaque transition (or alternatively an opaque to transparent transition). In addition, a width of each gap 18 plus a linewidth of an adjacent concentric ring 16', which together form a repeating periodic structure, is no greater than one-half a minimum wavelength of radiation intended as incident upon the tunable Fresnel zone lens apparatus 100. The foregoing gap 18 width plus concentric ring 16' linewidth distance limitation for separation of adjacent concentric rings 16' within the tunable Fresnel zone lens apparatus in accordance with the embodiments is intended to provide a circumstance where the minimum radiation wavelength operation (and all longer wavelength radiation operation) using a tunable Fresnel zone lens apparatus 100 in accordance with the embodiments does not effectively diffract the minimum radiation wavelength (or longer radiation wavelength) under circumstances where all of the concentric rings 16' that are illustrated within the Fresnel zone lens apparatus 100 in accordance with FIG. 1A are in the same optical transition state (i.e., transparent or opaque).

While FIG. 1A illustrates a tunable Fresnel zone lens apparatus 100 in accordance with the embodiments that includes the plurality of adjacent concentric rings 16' as nominally circular rings, the embodiments in general are not necessarily intended to be so limited to a tunable Fresnel zone lens apparatus that includes as adjacent but separated symmetric repeating structures only adjacent but separated concentric circular rings. Rather a Fresnel zone lens apparatus in accordance with the embodiments may also comprise a plurality of adjacent concentric elliptical ring structures or a plurality of other adjacent concentric ring type structures, where such other adjacent concentric ring type structures include enclosed ring type structures. Any of the foregoing adjacent concentric ring type structures may provide a tunable Fresnel zone lens apparatus in accordance with the embodiments, whether or not the plurality of concentric ring type structures is enclosed. Finally, the embodiments also contemplates a tunable one-dimensional Fresnel zone lens apparatus or a tunable optical diffraction grating apparatus that does not include symmetric repeating concentric ring structures located and formed over a substrate, but rather includes symmetric repeating line or symmetric repeating arc structures located and formed over a substrate. Specific examples of the foregoing Fresnel zone lens apparatus may be found in U.S. Patent Application Publication 2007/0179239, the content of which is incorporate herein fully by reference to the extent allowed.

Figure 1B:
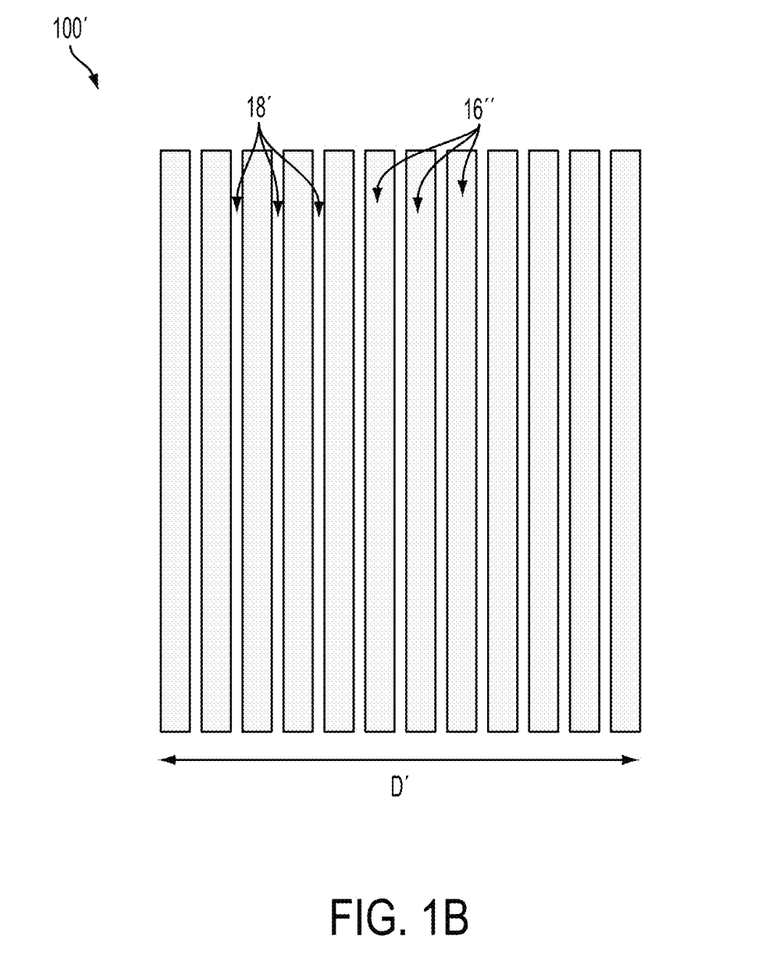
FIG. 1B shows a schematic plan-view diagram of a one-dimensional Fresnel zone lens apparatus in accordance with the embodiments.

Within the context of such alternative diffraction grating structures, FIG. 1B in particular shows such a one-dimensional Fresnel zone lens apparatus 100'. Within FIG. 1B, a plurality of symmetric repeating structures is in the form of a plurality of parallel lines 16" rather than a plurality of concentric circles 16', and a plurality of gaps 18' interposed between the plurality of parallel lines 16" comprise line shaped gaps 18' rather than concentric circular shaped gaps 18 as illustrated in FIG. 1A. FIG. 1B also shows a diameter dimension D' for the one-dimensional Fresnel zone lens apparatus that correlates with the diameter D within the Fresnel zone lens apparatus of FIG. 1A.

As will be discussed in greater detail below, each of the plurality of concentric rings 16' that comprises the Fresnel zone lens apparatus 100 whose schematic plan-view diagram is illustrated in FIG. 1A comprises a material that is controllably susceptible to a transparent to an opaque transition (which is also intended to include an opaque to a transparent transition). Although any of several materials may thus be used for forming the concentric rings 16', most typically and preferably each of the concentric rings 16' comprises a vanadium oxide material, and more specifically a vanadium dioxide material, although other candidate materials are also considered below.

Finally, a tunable Fresnel zone lens in accordance with the embodiments and in accordance with FIG. 1A will typically have a diameter D from about 1 to about 10 centimeters and include a plurality of concentric rings 16' that numbers from about 5000 to about 50000 concentric rings 16'.

Figure 2A:
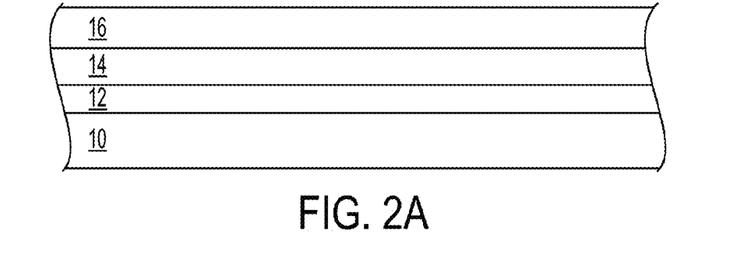
FIG. 2A, FIG. 2B and FIG. 2C show a series of schematic cross-sectional diagrams illustrating the results of progressive process stages in fabricating a Fresnel zone lens apparatus in accordance with the embodiments.
Figure 2B:
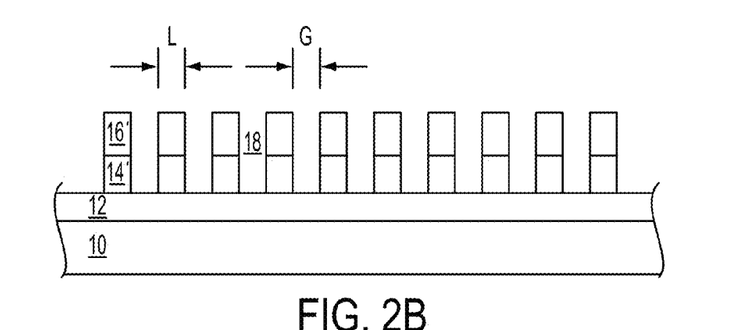
Figure 2C:
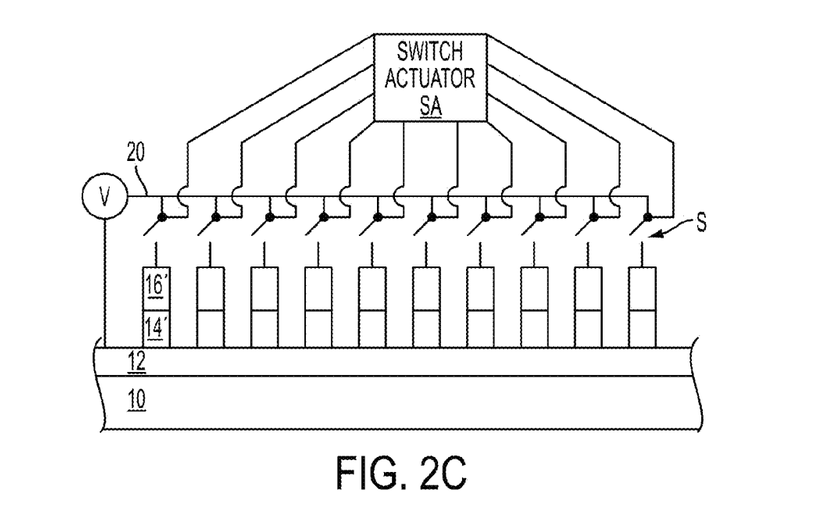

FIG. 2A, FIG. 2B and FIG. 2C show a series of schematic cross-sectional diagrams illustrating the results of progressive stages in fabricating a tunable Fresnel zone lens apparatus in accordance with the embodiments, and more particularly including a tunable Fresnel zone lens apparatus in accordance with FIG. 1A.

FIG. 2A first shows a substrate 10. A common electrode material layer 12 (i.e., typically but not necessarily a common anode material layer) is located and formed over, and generally upon, the substrate 10. A charge injection material layer 14 is located and formed over, and generally upon, the common electrode material layer 12. An optical transition material layer 16 is located and formed over, and generally upon, the charge injection material layer 14. Within the embodiments, each of the foregoing layers that comprises the tunable Fresnel zone lens apparatus precursor structure whose schematic cross-sectional diagram is illustrated in FIG. 2A may comprise materials and have dimensions as are otherwise generally conventional in the optics component design and fabrication art, including in particular the electro-optics component design and fabrication art. Although not specifically illustrated within the schematic cross-sectional diagram of FIG. 2A, additional layers which are passive to operation of a tunable Fresnel zone lens apparatus may also be included.

For example, the substrate 10 may comprise any of several substrate materials, including but not limited to transparent substrate materials and opaque substrate materials. Such opaque substrate materials will similarly also typically comprise reflective opaque substrate materials or reflective coated opaque substrate materials rather than absorptive opaque substrate materials, although absorptive opaque substrate materials are not excluded. In most common applications, the substrate 10 comprises a transparent substrate material that is transparent to a designated radiation wavelength or wavelength range (or further alternatively a designated minimum radiation wavelength) whose incidence is intended upon a Fresnel zone lens apparatus that results from further fabrication of the Fresnel zone lens precursor structure whose schematic cross-sectional diagram is illustrated in FIG. 2A.

Within the context of designated radiation wavelengths in the visible and short to mid infrared spectrum region from about 0.5 to about 5 microns, the substrate 10 may comprise, but is not necessarily limited to a quartz substrate, a glass substrate, a sapphire substrate, certain polymer material substrates, certain composite material substrates and certain ceramic material substrates. Within the context of designated radiation wavelengths in the long infrared spectrum region from about 5 to about 20 microns, the substrate 10 may comprise a semiconductor substrate such as but not limited to a silicon, germanium or silicon-germanium alloy semiconductor substrate, or the substrate 10 may comprise certain ceramics including but not limited to barium fluoride, zinc sulfide or zinc selenide containing ceramics, or further alternatively other materials designed for use in the infrared wavelength region, such as KRS5 or IRX based on proprietary material formulations.

In addition, with respect to the common electrode material layer 12, which is generally intended as a transparent common electrode material layer 12 when the substrate 10 comprises a transparent substrate 10, the common electrode material layer 12 may comprise any of several common electrode materials from which may be comprised common electrode material layers. Typically and preferably, the common electrode material layer 12 comprises an indium-tin-oxide common electrode material or alternative nominally transparent conductive metal oxide material, that has a thickness from about 20 to about 50 nanometers. In addition and as an alternative, a graphene monolayer material layer may also be used in place of a transparent metal oxide material as the common electrode material layer 12.

The charge injection material layer 14 may comprise any of several charge injection materials that are otherwise generally conventional in the optical device design and fabrication art, and more particularly the electro-optic device design and fabrication art. Such charge injection materials may include, but are not necessarily limited to any of several semiconductor charge injection materials, as well as titanium dioxide charge injection materials. In general, the charge injection material layer 14 comprises a charge injection material whose charge injection characteristics are mated within the context of materials properties of the optical transition material layer 16. Typically and preferably, the charge injection material layer comprises a titanium oxide (more specifically, titanium dioxide) charge injection material that has a thickness from about 50 to about 100 nanometers. Typically and preferably, the charge injection material layer 14 will also include a free charge carrier concentration (e.g., typically electrons) from about 1e18 to about 1e19 charge carriers per cubic centimeter to provide proper operation of a tunable Fresnel zone lens apparatus in accordance with the embodiments.

Finally, the optical transition material layer 16 comprises an optical transition material that undergoes an optical transition from a transparent state to an opaque state (or alternatively an opaque state to a transparent state) where the opaque state might also generally be a reflective opaque state rather than an absorbing opaque state. Within the context of the embodiments, the optical transition material layer 16 most preferably comprises a vanadium oxide (i.e., $VO_2$ or $V_2O_3$) optical transition material, and in particular a vanadium dioxide (i.e., $VO_2$) optical transition material, but the embodiments are not so limited. In that regard, additional optical transition materials that may be operative within an optical transition material layer 16 in accordance with the embodiments may include, but are not limited to, iron oxide (i.e., $Fe_3O_4$), iron sulfide (i.e., $FeSi_2$), niobium oxide ($NbO_2$) and titanium oxide (i.e., $Ti_2O_3$, $Ti_4O_7$ or $Ti_5O_9$) optical transition materials. Typically and preferably, the optical transition material layer 16 comprises a vanadium dioxide optical transition material that has a thickness from about 100 to about 200 nanometers.

As is understood by a person skilled in the art, the tunable Fresnel zone lens apparatus predecessor structure whose schematic cross-sectional diagram is illustrated in FIG. 2A may be fabricated using any of several methods that are otherwise generally conventional in the optic device design and fabrication art, and in particular the electro-optic device design and fabrication art. Such methods may include, but are not necessarily limited to chemical vapor deposition methods and physical vapor deposition methods. The foregoing physical vapor deposition methods may also include, but are not necessarily limited to purely physical vapor deposition methods intended to deposit a material upon or over the substrate 10 nominally unchanged from a composition of a target material that may be used within the physical vapor deposition method. Alternatively, the foregoing methods may also include reactive deposition methods where a deposited material layer has a composition different from a target material that is used in forming the deposited material layer, due to reaction of the target material layer when forming the deposited material layer within a reactive environment. A particular reactive environment may comprise an oxygen containing environment.

Moreover, the tunable Fresnel zone lens apparatus precursor structure whose schematic cross-sectional diagram is illustrated in FIG. 2A may be fabricated using separate and individual deposition tools, or in an alternative a single deposition tool or a cluster of environmentally interconnected deposition tools that is maintained under a single vacuum.

FIG. 2B shows the results of sequentially patterning the optical transition material layer 16 and the charge injection material layer 14 to form pillars comprising optical transition material layers 16' located and formed upon charge transfer material layers 14' in turn located and formed upon the common electrode material layer 12 which in turn is located and formed upon the substrate 10.

The foregoing sequential patterning of the optical transition material layer 16 and the charge injection material layer 14 to provide the corresponding optical transition material layers 16' and the charge injection material layers 14' may be effected using methods that are generally conventional in the optical device design and fabrication art, and in particular the electro-optic device design and fabrication art. Such methods may most commonly include, but are not necessarily limited to lithographic and etch methods, such as but not limited to photolithographic and etch methods, electron beam lithographic and etch methods and nanoimprint lithographic and etch methods. Such lithographic and etch methods may include purely physical etch methods such as but not limited to sputter etch methods that typically include argon ion sputter etch methods. Such lithographic and etch methods may also include reactive ion etch methods that use a chemically reactive etchant as an etch gas material, such as but not limited to a fluorocarbon etch gas material or a perfluorocarbon etch gas material.

As is illustrated within the schematic cross-sectional diagram of FIG. 2B, and consistent with discussion above within the context of the schematic plan-view diagram of FIG. 1A, FIG. 2B shows that the optical transition material layers 16' and the charge injection material layers 14' each have a linewidth L and are separated by a gap 18 spacing distance G. As noted above, the summation of the gap 18 spacing distance G and the line width L is no greater than one-half a minimum wavelength of radiation that is intended to be incident upon the tunable Fresnel zone lens apparatus of FIG. 2B.

FIG. 2C finally shows a power supply V that is attached connected to the common electrode material layer 12 and intended to make connections to individual of the optical transition material layers 16' through a series of individual switches S within an interconnection layer 20 (i.e., a circuitry layer). In addition, FIG. 2C shows a switch actuator SA connected to each of the switches S. Thus, the embodiment as illustrated in FIG. 2C provides that each individual optical transition material layer 16' (i.e., as illustrated as a concentric ring as illustrated in FIG. 1A in plan-view diagram) may be individually electrically biased while using the power supply V as illustrated in FIG. 2C to provide an electric field localized to that particular individual optical transition material layer 16', and thus optically transition that particular optical transition material layer 16' from an optically transparent state to an optically opaque state or an optically opaque state to an optically transparent state. Moreover, the foregoing optical transitioning of the individual optical transition material layers 16' is intended to be effected in a fashion while using the switch actuator SA such that variable adjacent sub-pluralities of optical transition material layers 16' that comprise transparent zones are interposed with variable adjacent sub-pluralities of optical transition material layers 16' that comprise opaque zones, as is illustrated further below. Generally, an electric field from about 10e4 to about 10e6 volts per centimeter is needed to provide proper optical switching of individual optical transition material layers 16' when the individual optical transition material layers 16' comprise a vanadium oxide material, such as but not limited to a vanadium dioxide material.

While FIG. 2C shows a Fresnel zone lens apparatus comprising individual optical transition material layers 16' and charge injection material layers 14' whose optical transitions are individually optically switched using the power supply V to provide an electric field that effects the optical switching within a timescale from about 1 to about 100 nanoseconds, the embodiments are not intended to be so limited. Rather, albeit with a compromise of optical switching performance, the tunable Fresnel zone lens apparatus whose schematic cross-sectional diagram is illustrated in FIG. 2C or whose schematic plan-view diagram is illustrated in FIG. 1A may be appropriately energetically activated to provide for individual optical transition of the optical transition material layers 16' while using alternative activation means. Such alternative activation means may include, but are not necessarily limited to, heating activation means, optical activation means, pressure activation means and electrical current activation means.

Figure 3A:
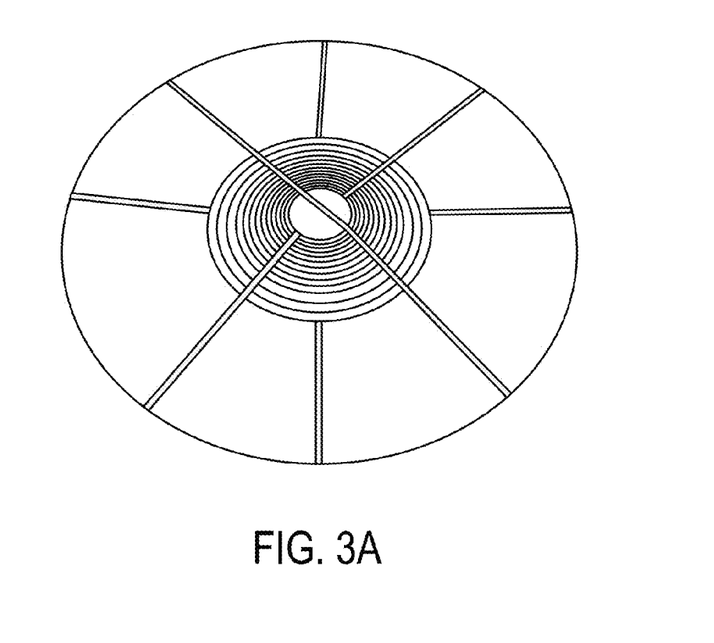
FIG. 3A and FIG. 3B show a pair of schematic plan-view diagrams of a Fresnel zone lens apparatus operating in accordance with the embodiments.

FIG. 3A shows the results of operation of a tunable Fresnel zone lens apparatus in accordance with the embodiments. The tunable Fresnel zone lens apparatus whose operation is illustrated in FIG. 3A first shows a tunable Fresnel zone lens apparatus with an opaque central region zone surrounded by a transparent zone that comprises a variable sub-plurality of transparent concentric rings. The transparent zone that comprises the variable sub-plurality of transparent concentric rings is in turn circumferentially surrounded by an outer opaque zone that comprises a variable sub-plurality of opaque concentric rings. The four lines that cross a diameter of the Fresnel zone lens apparatus whose schematic plan-view diagram is illustrated in FIG. 3A are intended as electrical connection lines with respect to the plurality of concentric rings that comprise the tunable Fresnel zone lens apparatus, whether the plurality of concentric rings is electrically biased or not.

Figure 3B:
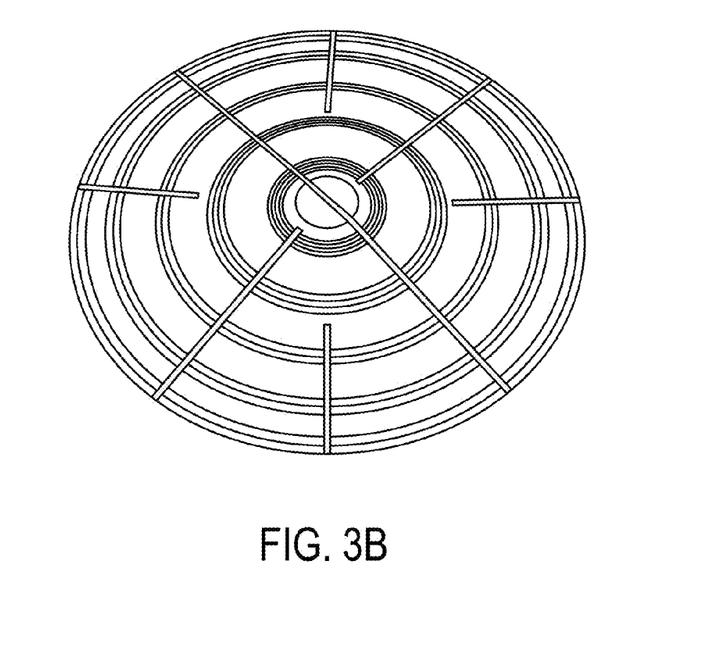

FIG. 3B shows a tunable Fresnel zone lens apparatus related to the tunable Fresnel zone lens apparatus whose schematic plan-view diagram is illustrated in FIG. 3A, but with a different electrical field biasing scheme for specific variable sub-pluralities of concentric rings in comparison with the tunable Fresnel zone lens apparatus whose schematic plan-view diagram is illustrated in FIG. 3A. The electric field biasing scheme that provides the tunable Fresnel zone lens apparatus whose schematic plan-view diagram is illustrated in FIG. 3B provides the tunable Fresnel zone lens apparatus with a central transparent zone and five surrounding concentric transparent zones each comprising a variable sub-plurality of transparent adjacent concentric rings. Interposed between the foregoing six concentric transparent zones is a corresponding series of five concentric opaque zones each of which has a zone radius which is fixed and the same as the transparent zones to provide in an aggregate a sinusoidal tunable Fresnel zone lens apparatus.

As is understood by a person skilled in the art, the tunable Fresnel zone lens apparatus whose schematic plan-view diagrams are illustrated in FIG. 3A and FIG. 3B provide tunable Fresnel zone lens apparatus insofar as differing and variable numbers of adjacent concentric rings (i.e., symmetric repeating structures) may be switched on or switched off to provide for transparent zones and opaque zones of different zone radii or alternatively of different zone area. Thus, the embodiments provide an opportunity for fabricating both tunable sinusoidal Fresnel zone lens apparatus and tunable binary Fresnel zone lens apparatus.

With the context of the sinusoidal (or binary) Fresnel zone lens apparatus whose schematic plan-view diagram is illustrated in FIG. 3A, and particularly in FIG. 3B, such a tuning by changing the number of adjacent rings within a particular zone and thus the particular zone radius will provide different focal lengths at a fixed wavelength, or to focus different wavelengths at a fixed focal length of the particular tunable Fresnel zone lens apparatus. The different focal lengths may be desirable in correcting for chromatic aberrations associated with a Fresnel zone lens, or in discriminating between different incident wavelength regions upon a single detector or focal plane detector array for hyperspectral imaging.

Alternatively, the embodiments also contemplate the possibility of providing a tunable binary Fresnel zone lens apparatus by adjusting a number of adjacent rings to provide transparent zones and opaque zones that include the same amount of surface area. These particular Fresnel zone lens apparatus with transparent and opaque zones that encompass the same amount of surface area unlike the foregoing sinusoidal Fresnel zone lens apparatus, do not have a single focal plane but rather have a primary focal plane and a plurality of secondary focal planes.

In summary, embodiments provide a Fresnel zone lens apparatus, a method for fabricating the Fresnel zone lens apparatus and a method of operating the Fresnel zone lens apparatus. The illustrative but not limiting Fresnel zone lens apparatus in accordance with the embodiments provides a plurality of concentric rings and the illustrative but not limiting Fresnel zone lens apparatus in accordance with the embodiments also provides for selection of variable sub-pluralities of adjacent concentric rings for either transparent zones or opaque zones interposed between the transparent zones.

All references, including publications, patent applications, and patents cited herein are hereby incorporated by reference in their entireties to the extent allowed and as if each reference was individually and specifically indicated to be incorporated by reference and was set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

Thus, the embodiments are illustrative of the invention rather than limiting of the invention. Revisions and modifications may be made to methods materials, structures and dimensions of a Fresnel zone lens apparatus in accordance with the embodiments while still providing an optical apparatus, a method for fabricating the optical apparatus and a method for operating the optical apparatus in accordance with the invention, further in accordance with the accompanying claims.

What is claimed is:

1. An optical apparatus, comprising:
a plurality of symmetric repeating structures located separated over a substrate and interposed between a common electrode layer and a switched electrode also located over the substrate, wherein each of the plurality of symmetric repeating structures comprises a laminate comprising:
a material controllably susceptible to a transparent to opaque transition when activated by a charge injected into the material; and
a charge injection material, wherein:
the optical apparatus is adapted to inject the charge via the charge injection material to separately effect the transparent to opaque transition of each of the plurality of symmetric repeating structures; and
the optical apparatus is characterized by the plurality of variably effected transparent and opaque symmetric repeating structures alternately interposed with each other over the substrate upon a switching operation of the switched electrode.

2. The optical apparatus of claim 1 wherein the substrate comprises a transparent substrate.

3. The optical apparatus of claim 1 wherein the substrate comprises a reflective substrate.

4. The optical apparatus of claim 1 wherein the plurality of symmetric repeating structures comprises a plurality of concentric rings.

5. The optical apparatus of claim 4 wherein the plurality of concentric rings comprises circular rings.

6. The optical apparatus of claim 4 wherein the plurality of concentric rings comprises elliptical rings.

7. The optical apparatus of claim 1 wherein:
the optical apparatus comprises a binary Fresnel zone lens apparatus; and
the switching operation of the switched electrode provides for variation of a zone area.

8. The optical apparatus of claim 1 wherein:
the optical apparatus comprises a sinusoidal Fresnel zone lens apparatus; and
the switching operation of the switched electrode provides for variation of a zone radius.

9. The optical apparatus of claim 1 wherein:
a maximum symmetric repeating structure periodicity defined by a linewidth plus a line separation distance of each symmetric repeating structure is no greater than about one-half the minimum designated radiation wavelength.

10. The optical apparatus of claim 1, wherein the material susceptible to the transparent to opaque transition comprises a vanadium oxide material.

11. The optical apparatus of claim 10 wherein the laminate includes the vanadium oxide material contacting the charge injection material selected from the group consisting of a titanium oxide material and a semiconductor material.

12. The optical apparatus of claim 11 wherein the laminate comprises a laminate of the vanadium oxide material contacting the charge injection material selected from the group consisting of a titanium oxide material and a semiconductor material, the laminate being interposed between an electrode and a switched voltage source, the electrode being interposed between the laminate and the substrate.

13. The optical apparatus of claim 1 wherein the laminate consists essentially of:
the material controllably susceptible to the transparent to opaque transition; and
the charge injection material.

14. A method for fabricating an optical apparatus comprising:
forming over a substrate a plurality of symmetric repeating structures formed separated over the substrate and interposed between a common electrode layer and a switched electrode also formed over the substrate, wherein each of the plurality of symmetric repeating structures comprises a laminate comprising:
a material controllably susceptible to a transparent to opaque transition when activated by a charge injected into the material; and
a charge injection material, wherein:
the optical apparatus is adapted to inject the charge via the charge injection material to separately effect the transparent to opaque transition of each of the plurality of symmetric repeating structures; and
the optical apparatus is characterized by the plurality of variably effected transparent and opaque symmetric repeating structures alternately interposed with each other over the substrate upon a switching operation of the switched electrode.

15. The method of claim 14 wherein the substrate comprises a transparent substrate.

16. The method of claim 14 wherein the substrate comprises a reflective substrate.

17. The method of claim 14 wherein the plurality of symmetric repeating structures comprises a plurality of concentric rings.

18. The method of claim 14, wherein the material controllably susceptible comprises a vanadium oxide optical transition material.

19. The method of claim 18, wherein the laminate includes the vanadium oxide optical transition material contacting the charge injection material selected from the group consisting of titanium oxide charge injection materials and semiconductor charge injection materials.

20. The method of claim 19 wherein the laminate comprises a laminate of the vanadium oxide material contacting the charge injection material selected from the group consisting of a titanium oxide material and a semiconductor material, the laminate being interposed between an electrode and a switched voltage source, the electrode being interposed between the laminate and the substrate.

21. The method of claim 14 wherein the laminate consists essentially of:
the material controllably susceptible to the transparent to opaque transition; and
the charge injection material.

22. A method for operating an optical apparatus comprising:
providing an optical apparatus comprising:
a plurality of symmetric repeating structures located separated over a substrate and interposed between a common electrode layer and a switched electrode also located over the substrate, wherein each of the plurality of symmetric repeating structures comprises a laminate comprising:
a material controllably susceptible to a transparent to opaque transition when activated by a charge injected into the material; and
a charge injection material, wherein:
the optical apparatus is adapted to inject the charge via the charge injection material to separately effect the transparent to opaque transition of each of the plurality of symmetric repeating structures; and
the optical apparatus is characterized by the plurality of variably effected transparent and opaque symmetric repeating structures alternately interposed with each other over the substrate upon a switching operation of the switched electrode; and enabling the switching operation for separately effecting the transparent to opaque transition for each of the plurality of symmetric repeating structures to provide the plurality of variably effected transparent and opaque symmetric repeating structures alternately interposed with each other over the substrate.

23. The method of claim 22 wherein the substrate comprises a transparent substrate.

24. The method of claim 22 wherein the substrate comprises a reflective substrate.

25. The method of claim 22 wherein the plurality of symmetric repeating structures comprises a plurality of concentric rings.

26. The method of claim 22 wherein the material susceptible to the transparent to opaque transition comprises a vanadium oxide material.

27. The method of claim 26 wherein the laminate includes the vanadium oxide material contacting the charge injection material selected from the group consisting of a titanium oxide material and a semiconductor material.

28. The method of claim 27 wherein the electric laminate comprises a laminate of the vanadium oxide material contacting the charge injection material selected from the group consisting of a titanium oxide material and a semiconductor material, the laminate being interposed between an electrode and a switched voltage source, the electrode being interposed between the laminate and the substrate.

29. The method of claim 22 wherein the laminate consists essentially of:

the material controllably susceptible to the transparent to opaque transition; and the charge injection material.

* * * * *